US009275611B2

(12) United States Patent
Kim

(10) Patent No.: US 9,275,611 B2
(45) Date of Patent: Mar. 1, 2016

(54) DISPLAY DEVICE AND TOUCH SENSING METHOD THEREOF

(71) Applicant: LG Display Co., Ltd., Seoul (KR)

(72) Inventor: Sung Chul Kim, Goyang-si (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 14/139,279

(22) Filed: Dec. 23, 2013

(65) Prior Publication Data

US 2014/0240246 A1    Aug. 28, 2014

(30) Foreign Application Priority Data

Feb. 28, 2013    (KR) ........................ 10-2013-0022516

(51) Int. Cl.
*G06F 3/041* (2006.01)
*G09G 5/18* (2006.01)
*G06F 3/044* (2006.01)

(52) U.S. Cl.
CPC *G09G 5/18* (2013.01); *G06F 3/044* (2013.01); *G06F 3/0412* (2013.01); *G06F 3/0418* (2013.01)

(58) Field of Classification Search
CPC .......... G06F 3/042; G06F 2203/04109; G06F 3/041; G06F 3/0412; G06F 3/044; G06F 3/0418; G09G 3/3406; G09G 3/3413; G09G 3/342; G09G 3/3426; G09G 5/18
USPC ...................... 345/102, 173–179; 349/65–68; 362/97.1, 155, 611
See application file for complete search history.

(56) References Cited

U.S. PATENT DOCUMENTS

| 2010/0295824 | A1* | 11/2010 | Noguchi et al. | 345/175 |
| 2011/0298746 | A1* | 12/2011 | Hotelling | 345/174 |
| 2012/0001859 | A1* | 1/2012 | Kim et al. | 345/173 |

FOREIGN PATENT DOCUMENTS

| JP | 2010-271925 A | 12/2010 |
| KR | 10-2012-0111674 A | 10/2012 |

OTHER PUBLICATIONS

Office Action for Korean Patent Application No. KR 10-2013-0022516, Nov. 9, 2015, 5 Pages. (With Concise Explanation of Relevance).

* cited by examiner

*Primary Examiner* — Md Saiful A Siddiqui
(74) *Attorney, Agent, or Firm* — Fenwick & West LLP

(57) ABSTRACT

Disclosed is a display device capable of improving touch sensitivity by removing noise from a user's touch signal through compensation of display touch crosstalk, and a touch sensing method thereof, wherein the display device may include a timing controller for driving one frame by a time division method to alternately perform a displaying driving mode and a touch sensing mode; and a touch sensor for determining a DTX compensation block including at least one touch sensing block corresponding to a unit for sensing a user's touch; calculating a compensation representative value and a sensing block average value; and sensing a user's touch by compensating for touch data in accordance with a difference between the compensation representative value and the sensing block average value.

7 Claims, 7 Drawing Sheets

FIG. 6

| Mux3 | 60 | 89 | 94 | 120 | 73 | 86 | 121 | 156 | 81 | 65 | 48 | 21 | 11 | 14 | 13 | 16 | 14 | 76 | 109 | 71 |
|---|---|---|---|---|---|---|---|---|---|---|---|---|---|---|---|---|---|---|---|---|
| | 83 | 69 | 120 | 157 | 71 | 84 | 69 | 156 | 180 | 118 | 140 | 16 | 13 | 11 | 29 | 14 | 8 | 16 | 53 | 78 |
| Mux2 | 83 | 79 | 98 | 137 | 139 | 139 | 124 | 135 | 114 | 127 | 132 | 20 | 12 | 33 | 77 | 33 | 30 | 36 | 84 | 61 |
| | 132 | 122 | 105 | 119 | 138 | 137 | 196 | 169 | 173 | 207 | 151 | 41 | 26 | 32 | 103 | 24 | 35 | 43 | 106 | 41 |
| Mux1 | 107 | 78 | 114 | 100 | 66 | 105 | 65 | 183 | 162 | 120 | 193 | 82 | 29 | 84 | 136 | 16 | 71 | 80 | 102 | 71 |
| | 56 | 125 | 104 | 121 | 70 | 152 | 113 | 146 | 178 | 172 | 101 | 32 | 22 | 141 | 97 | 14 | 12 | 67 | 76 | 63 |
| Mux3 | 43 | 43 | 182 | 137 | 131 | 71 | 102 | 41 | 53 | 63 | 65 | 33 | 55 | 35 | 36 | 40 | 18 | 14 | 81 | 93 |
| | 14 | 15 | 25 | 51 | 79 | 117 | 71 | 48 | 55 | 56 | 72 | 69 | 51 | 65 | 78 | 60 | 57 | 37 | 60 | 89 |
| Mux2 | 15 | 25 | 14 | 119 | 108 | 100 | 49 | 58 | 77 | 26 | 78 | 92 | 58 | 63 | 63 | 54 | 72 | 45 | 104 | 80 |
| | 19 | 8 | 14 | 81 | 122 | 91 | 90 | 111 | 73 | 24 | 62 | 69 | 114 | 109 | 114 | 52 | 46 | 57 | 51 | 154 |
| Mux1 | 107 | 80 | 68 | 23 | 104 | 79 | 124 | 137 | 149 | 90 | 131 | 67 | 57 | 82 | 66 | 41 | 44 | 103 | 102 | 49 |
| | 142 | 106 | 100 | 114 | 92 | 132 | 89 | 54 | 68 | 85 | 42 | 66 | 59 | 69 | 58 | 67 | 76 | 59 | 76 | 56 |

FIG. 7

| Mux3 | -6 | 21 | 26 | 61 | 4.8 | 19 | 64 | 105 | 16 | -1 | -25 | -54 | -77 | -69 | -72 | -64 | -69 | 9.6 | 43 | 3.1 |
|---|---|---|---|---|---|---|---|---|---|---|---|---|---|---|---|---|---|---|---|---|
| | 17 | 1.9 | 61 | 107 | 3.1 | 18 | 1.9 | 105 | 149 | 57 | 87 | -64 | -72 | -77 | -44 | -69 | -82 | -64 | -15 | 13 |
| Mux2 | 0.6 | -2 | 13 | 66 | 69 | 69 | 51 | 64 | 34 | 55 | 61 | -72 | -92 | -59 | -6 | -59 | -60 | -56 | 1.3 | -21 |
| | 61 | 48 | 21 | 42 | 68 | 66 | 186 | 111 | 117 | 214 | 82 | -58 | -64 | -59 | 21 | -67 | -58 | -51 | 23 | -56 |
| Mux1 | 21 | -3 | 31 | 13 | -21 | 18 | -21 | 138 | 99 | 41 | 169 | -4 | -64 | -3 | 62 | -85 | -17 | -5 | 14 | -17 |
| | -31 | 48 | 18 | 43 | -18 | 79 | 28 | 74 | 123 | 111 | 13 | -63 | -73 | 68 | 8.1 | -90 | -96 | -20 | -11 | -19 |
| Mux3 | -35 | -35 | 120 | 83 | 76 | 3.1 | 35 | -39 | -15 | -2 | -1 | -42 | -12 | -41 | -41 | -39 | -59 | -69 | 16 | 24 |
| | -69 | -67 | -49 | -19 | 15 | 56 | 3.1 | -25 | -12 | -11 | 3.9 | 1.9 | -19 | -1 | 13 | -6 | -9 | -40 | -6 | 21 |
| Mux2 | -83 | -66 | -86 | 42 | 25 | 16 | -40 | -25 | -6 | -64 | -4 | 6.6 | -25 | -19 | -19 | -30 | -13 | -47 | 21 | -1 |
| | -73 | -99 | -86 | -1 | 48 | 5.9 | 4.4 | 29 | -12 | -67 | -20 | -15 | 34 | 26 | 34 | -24 | -46 | -26 | -36 | 84 |
| Mux1 | 21 | -5 | -19 | -72 | 18 | -6 | 48 | 63 | 77 | 0.6 | 56 | -20 | -30 | -4 | -21 | -59 | -53 | 18 | 14 | -43 |
| | 69 | 19 | 13 | 31 | 2.9 | 57 | 0 | -34 | -19 | -2 | -58 | -21 | -27 | -19 | -29 | -20 | -11 | -27 | -11 | -31 |

DISPLAY DEVICE AND TOUCH SENSING METHOD THEREOF

CROSS REFERENCE TO RELATED APPLICATIONS

This application claims priority under 35 U.S.C. §119(a) from Korean Patent Application No. 10-2013-0022516 filed on Feb. 28, 2013, which is hereby incorporated by reference as if fully set forth herein.

BACKGROUND

1. Field of the Disclosure

Embodiments of the present invention relate to a display device and a touch sensing method thereof, and more particularly, to a display device integrated with a touch sensor and a touch sensing method thereof.

2. Discussion of the Related Art

With a development of various portable electronic devices such as a mobile phone and a notebook computer, a demand for flat display devices to be applied to the various portable electronic devices has been increased steeply.

For example, the flat display devices may include a liquid crystal display device, a plasma display panel, a field emission display device, a light emitting diode display device, and an organic light emitting diode display device.

Among the above flat display devices, an application of the liquid crystal display device is gradually increased owing to advantages of mass production technology, easy driving, high quality image with good resolution, and large-sized screen. Furthermore, a liquid crystal display device having a touch screen has attracted great attentions, wherein the liquid crystal display device having a touch screen facilitates to directly input information to a screen through the use of finger or pen.

When the touch screen is applied to the liquid crystal display device, the related art inevitably needs a touch panel additionally provided on a liquid crystal panel. Recently, in accordance with a demand for slimness, a liquid crystal panel integrated with a touch screen has been developed.

Especially, an in-cell touch type liquid crystal display device has been actively studied, wherein a common electrode formed on a lower substrate is used as a touch sensing electrode.

In case of the in-cell touch type liquid crystal display device, a pixel for displaying an image is formed together with a touch screen for sensing a user's touch, whereby displaying an image and sensing touch are separately driven by a time division method due to the above structural properties.

If there is a user's touch during a touch sensing period (non-display period), a capacitance change occurs in a touch sensing block with the user's touch, and a touch sensing electrode senses the capacitance change, to thereby sense whether or not there is a user's touch.

According to the related art, when a touch sensor is formed outside the liquid crystal panel, a displaying driving mode and a touch sensing driving mode are separately performed so that the respective modes are not affected. However, if the touch sensor is provided inside the liquid crystal panel, the respective modes might be mutually affected.

That is, the touch sensing driving may be affected by the displaying driving, or the displaying driving may be affected by the touch sensing driving. This will be described in detail with reference to Figure (FIG.) 1.

FIG. 1 illustrates capacitance changes of a pixel for displaying black and a pixel for displaying white in an in-cell touch type liquid crystal display device according to the related art.

As shown in FIG. 1, an alignment of liquid crystal in the pixel for displaying black (black) is different from an alignment of liquid crystal in the pixel for displaying white (white), whereby a capacitance difference (Cm_w−Cm_b) of a liquid crystal layer occurs.

The capacitance difference between the pixels remains in the pixels even after a start of the touch sensing period, whereby the touch sensing may be affected by the capacitance difference. The capacitance difference serves as "off-set", that is, noise in touch sensing, which is referred to as "DTX: Display Touch Crosstalk".

This display touch crosstalk may deteriorate touch accuracy and stability.

SUMMARY

Accordingly, embodiments of the present invention are directed to a display device and a touch sensing method that substantially obviate one or more problems due to limitations and disadvantages of the related art.

An aspect of embodiments of the present invention is directed to provide a display device which is capable of sensing a user's touch after compensation of a display touch crosstalk, and a touch sensing method of the display device.

Another aspect of embodiments of the present invention is directed to provide a display device which facilitates to improve touch sensitivity by sensing a user's touch after compensation of a display touch crosstalk, and a touch sensing method of the display device.

Additional advantages and features of embodiments of the invention will be set forth in part in the description which follows and in part will become apparent to those having ordinary skill in the art upon examination of the following or may be learned from practice of embodiments of the invention. The objectives and other advantages of embodiments of the invention may be realized and attained by the structure particularly pointed out in the written description and claims hereof as well as the appended drawings.

To achieve these and other advantages and in accordance with the purpose of embodiments of the invention, as embodied and broadly described herein, there is provided a display device that may include a timing controller for driving one frame by a time division method so as to alternately perform a displaying driving mode for displaying an image on a display panel and a touch sensing mode for sensing a user's touch; and a touch sensor for determining a DTX compensation block including at least one touch sensing block corresponding to a unit for sensing a user's touch, calculating a compensation representative value which is a DTX value corresponding to a first average of grayscale values applied to a plurality of pixels overlapped with the DTX compensation block, and calculating a sensing block average value which is a DTX value corresponding to a second average of grayscale values applied to a plurality of pixels overlapped with the touch sensing block; and sensing a user's touch by compensating for touch data in accordance with a difference between the compensation representative value and the sensing block average value.

In another aspect of embodiments of the present invention, there is provided a touch sensing method of a display device for driving one frame by a time division method so as to alternately perform a displaying driving mode for displaying an image on a display panel and a touch sensing mode for sensing a user's touch, that may include determining a DTX compensation block including at least one touch sensing block corresponding to a unit for sensing a user's touch; in the touch sensing mode, calculating a compensation representative value which is a DTX value corresponding to a first average of grayscale values applied to a plurality of pixels overlapped with the DTX compensation block, and calculating a sensing block average value which is a DTX value corresponding to a second average of grayscale values applied to a plurality of pixels overlapped with the touch sensing block; and in the touch sensing mode, calculating a DTX compensation value in accordance with a difference between the compensation representative value and the sensing block average value.

It is to be understood that both the foregoing general description and the following detailed description of embodiments of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 6 illustrates the average of grayscale values in a touch sensing block according to the present invention;

FIG. 7 illustrates a DTX compensation value of touch sensing block according to the present invention;

DETAILED DESCRIPTION OF THE INVENTION

Hereinafter, a display device according to embodiments of the present invention and a touch sensing method thereof will be described in detail with reference to the accompanying drawings.

According to one embodiment of the present invention, a display device may be a liquid crystal display (LCD) device. For convenience of explanation, the LCD device of the present invention is described in an exemplary embodiment. However, the display device of the present invention is not limited to the LCD device.

According to a method for controlling an alignment of liquid crystal layer, the LCD device may have various modes, for example, Twisted Nematic (TN) mode, Vertical Alignment (VA) mode, In-Plane Switching (IPS) mode, Fringe Field Switching (FFS) mode, and etc.

Among the above modes, in case of the IPS mode and the FFS mode, both a pixel electrode (pixel ITO) and a common electrode (Vcom) are formed on a lower substrate, whereby liquid crystal molecules included in a liquid crystal layer are aligned by an electric field between the pixel electrode and the common electrode. Thus, the IPS mode and the FFS mode may correspond to a method using an In-Plane Switching type electric field.

The LCD device according to the embodiment of the present invention may be applied to an LCD device in which both pixel and common electrodes are formed on a lower substrate, such as the IPS mode or FFS mode.

However, it is not limited to these modes. The LCD device according to the embodiment of the present invention may be applied to an LCD device in which a pixel electrode is formed on a lower substrate and a common electrode is formed on an upper substrate, such as the TN mode or VA mode.

Figure 1:
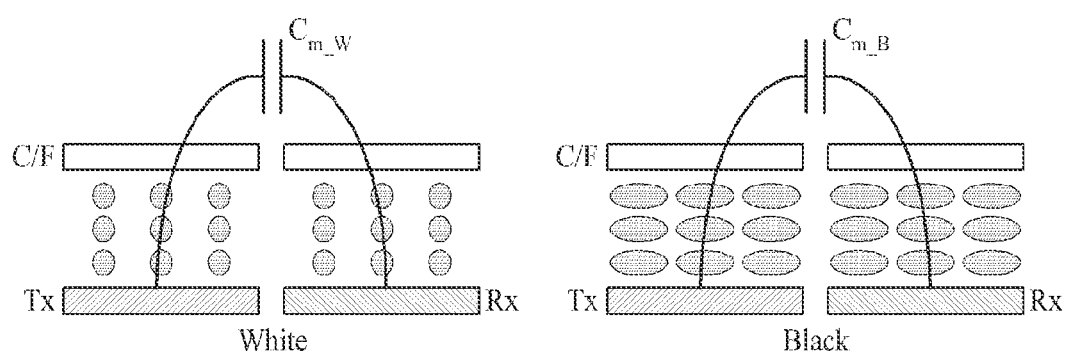
FIG. 1 illustrates capacitance changes of a pixel for displaying black and a pixel for displaying white in an in-cell touch type liquid crystal display device according to the related art.
Figure 2:
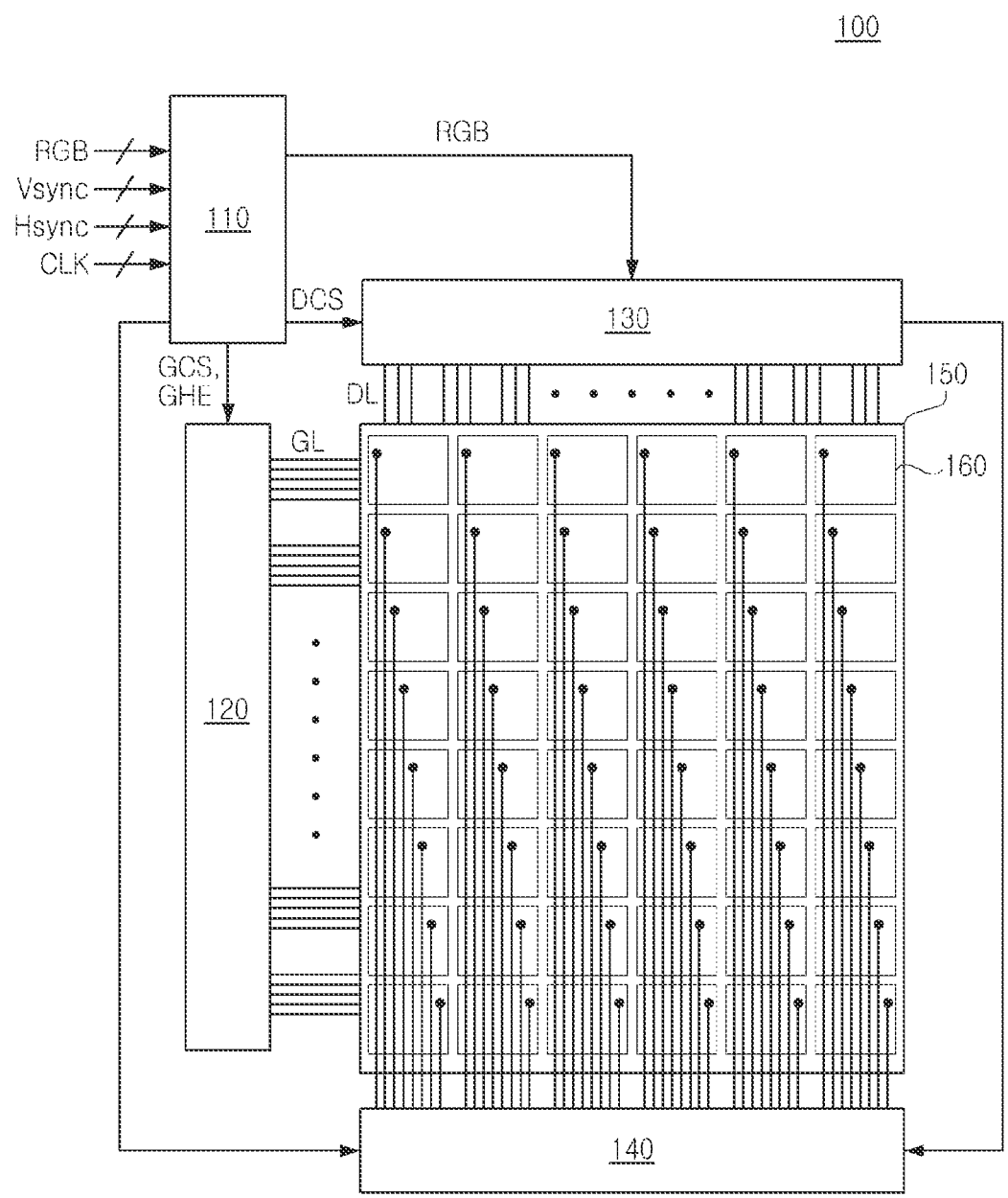
FIG. 2 illustrates a display device according to one embodiment of the present invention.

FIG. 2 illustrates a display device according to one embodiment of the present invention.

As shown in FIG. 2, the display device 100 according to the present invention may include a timing controller 110, a gate driver 120, a data driver 130, a touch sensor 140, a display panel 150, and a touch sensing block 160.

The timing controller 110 drives one frame period by a time-division method so that a displaying driving mode for displaying an image on the display panel 150 and a touch sensing mode for sensing a user's touch are alternately driven for one frame period.

For the displaying driving mode, the timing controller 110 aligns an externally-provided video signal, converts the aligned video signal into digital video data (R, G, B) in a unit frame, and supplies the digital video data (R, G, B) to the data driver 130.

For the touch sensing mode, the timing controller 110 generates a gate control signal (GCS) for controlling the gate driver 120 and a data control signal (DCS) for controlling the data driver 130 by the use of externally-provided vertical synchronous signal (Vsync), horizontal synchronous signal (Hsync), and clock signal (CLK).

The generated gate control signal (GCS) is supplied to the gate driver 120, and the generated data control signal (DCS) is supplied to the data driver 130.

The data control signal (DCS) may include a source start pulse (SSP), a source sampling clock (SSC), a source output enable (SOE), and a polarity control signal (POL).

The gate control signal (GCS) may include a gate start pulse (GSP), a gate shift clock (GSC), and a gate output enable (GOE).

Hereinafter, a method for alternately driving the displaying driving mode for displaying an image and the touch sensing mode for sensing a user's touch by the time-division method for one frame period will be described as follows.

Figure 3:
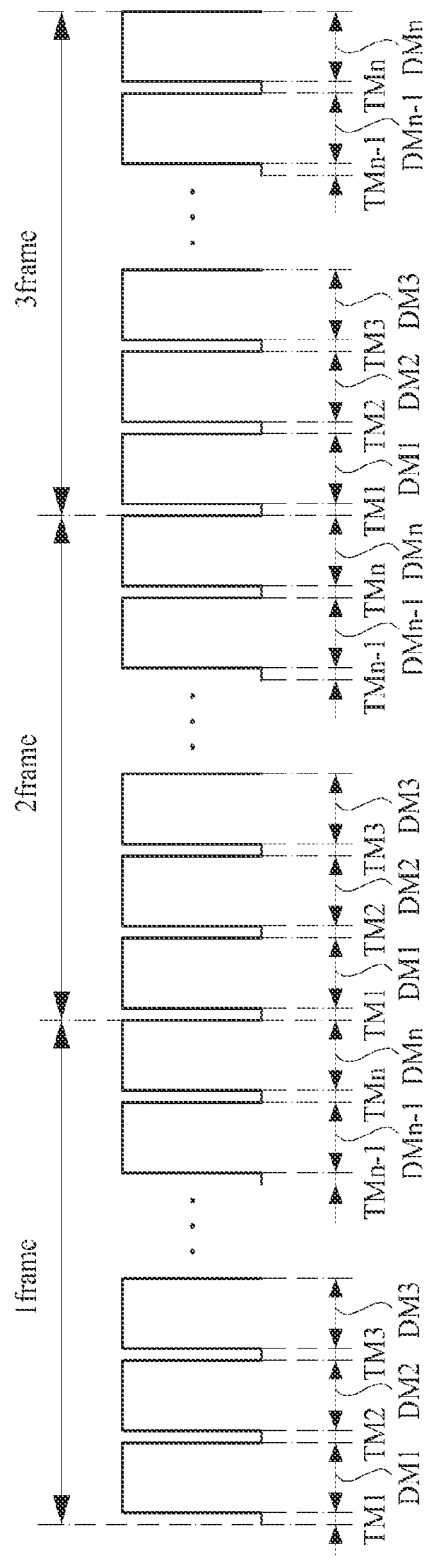
FIG. 3 illustrates a displaying driving mode and a touch sensing mode which are alternately driven by a time division method in the display device according to the present invention.

FIG. 3 illustrates the displaying driving mode and the touch sensing mode which are alternately driven by the time division method in the display device according to the present invention.

As shown in FIG. 3, the timing controller 110 of the display device 100 according to the present invention drives one frame period by the time-division method so that the displaying driving mode (hereinafter, referred to as 'display mode, DM') for displaying an image on the display panel 150 and the touch sensing mode (hereinafter, referred to as 'touch mode, TM') for sensing a user's touch are alternately driven for one frame period.

The display mode (DM) is for displaying a desired image on the display panel 150 and the touch mode (TM) is for sensing a touch location on the display panel 150.

According to one embodiment of the present invention, if forming the 'n' touch sensing blocks 160 in the direction parallel to the gate line on the display panel 150, the timing controller 110 alternately drives the display mode (DM) and the touch mode (TM) to be repeated 'n' times so as to sense a user's touch from the touch sensing blocks 160 of all the rows during one frame.

That is, during one frame, the timing controller 110 drives the touch mode (TM1) and the display mode (DM1) in the touch sensing blocks 160 arranged in the first row, drives the touch mode (TM2) and the display mode (DM2) in the touch sensing blocks 160 arranged in the second row, drives the touch mode (TMn−1) and the display mode (DMn−1) in the touch sensing blocks 160 arranged in the n−1th row, and drives the touch mode (TMn) and the display mode (DMn) in the touch sensing blocks 160 arranged in the nth row, thereby controlling the time-division method.

According to one embodiment of the present invention, in case of TFT-LCD display device of XGA grade with 768 gate lines, a TFT turn-on time of the gate line is not more than 21 usec, and a time of one frame is 16.7 msec when it is refreshed at a speed of 60 frames per second. Thus, the touch mode (TM) and the display mode (DM) are alternately repeated in 16.7 msec cycle.

In this case, a maintenance time of the touch mode (TM) is relatively shorter than a maintenance time of the display mode (DM). That is, the touch mode (TM) is driven for a short time period between each of the display modes (DM), whereby it is possible to prevent a picture quality of the image displayed on the display panel 150 from being deteriorated. According to one embodiment of the present invention, the maintenance time of the touch mode (TM) is about 1/10, 1/40 or less in comparison to the maintenance time of the display mode (DM).

The gate driver 120 turns on a switching device connected with the gate line to be displayed with an image for the display mode (DM). According to one embodiment of the present invention, the gate driver 120 receives a signal from the timing controller 110, and applies a gate high voltage (VGH) to the gate line, to thereby turn on the switching device.

When the switching device connected with the gate line is turned-on, the data driver 130 outputs display data to the data line. In this case, the display data may be a grayscale value with grayscale information to display an image.

The touch sensor 140 senses a user's touch by the use of touch raw data which is input from the neighboring touch sensing block 160 for the touch mode (TM).

According to one embodiment of the present invention, as shown in FIG. 2, the touch sensor 140 senses a user's touch by a deviation of display information to be displayed in the neighboring touch sensing block 160 for the display mode (DM), but not limited to this method.

The touch sensor 140 determines a DTX compensation block including at least one touch sensing block corresponding to a unit for sensing a user's touch; calculates a compensation representative value which is a DTX value corresponding to the average of grayscale values applied to a plurality of pixels overlapped with the DTX compensation block, and a sensing block average value which is a DTX value corresponding to the average of grayscale values applied to a plurality of pixels overlapped with the touch sensing block; and compensates for the touch data in accordance with the difference between the compensation representative value and the sensing block average value, to thereby sense a user's touch.

Hereinafter, the touch sensor 140 will be described in detail with reference to the accompanying drawings.

Figure 4:
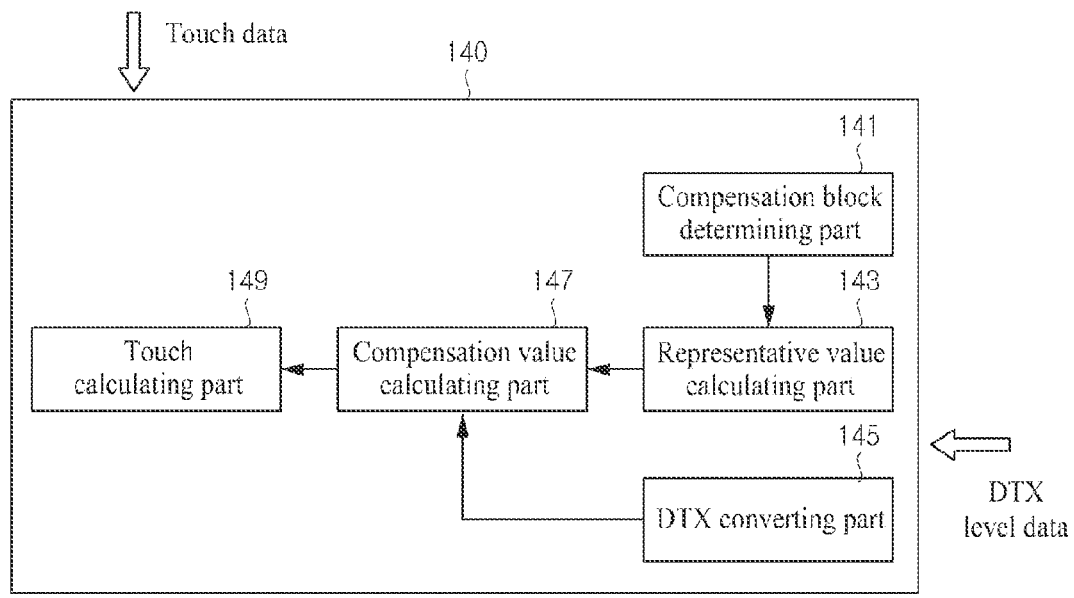
FIG. 4 illustrates a touch sensor according to one embodiment of the present invention.

FIG. 4 illustrates the touch sensor 140 according to one embodiment of the present invention.

As shown in FIG. 4, the touch sensor 140 may include a compensation block determining part 141, a representative value calculating part 143, a DTX converting part 145, a compensation value calculating part 147, and a touch calculating part 149. In this case, a Look-up Table for the DTX values corresponding to the grayscale values, that is, the data value to be displayed on the pixel may be stored in the data driver 130.

Figure 8:
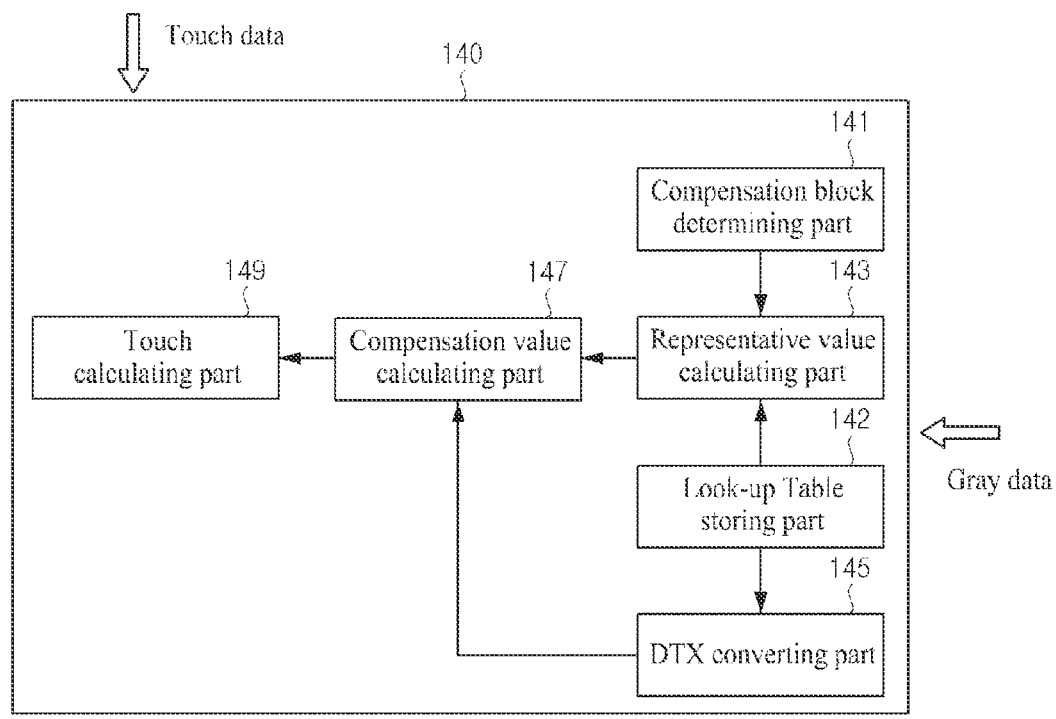
FIG. 8 illustrates a touch sensor according to another embodiment of the present invention.

FIG. 8 illustrates the touch sensor 140 according to another embodiment of the present invention.

As shown in FIG. 8, the touch sensor 140 may include a compensation block determining part 141, a representative value calculating part 143, a DTX converting part 145, a compensation value calculating part 147, a touch calculating part 149, and a Look-up Table storing part 142.

The touch sensor 140 divides the display panel 150 into at least one or more DTX compensation blocks, and compensates for the touch data with reference to the compensation representative value generated by each of the DTX compensation blocks.

Figure 5:
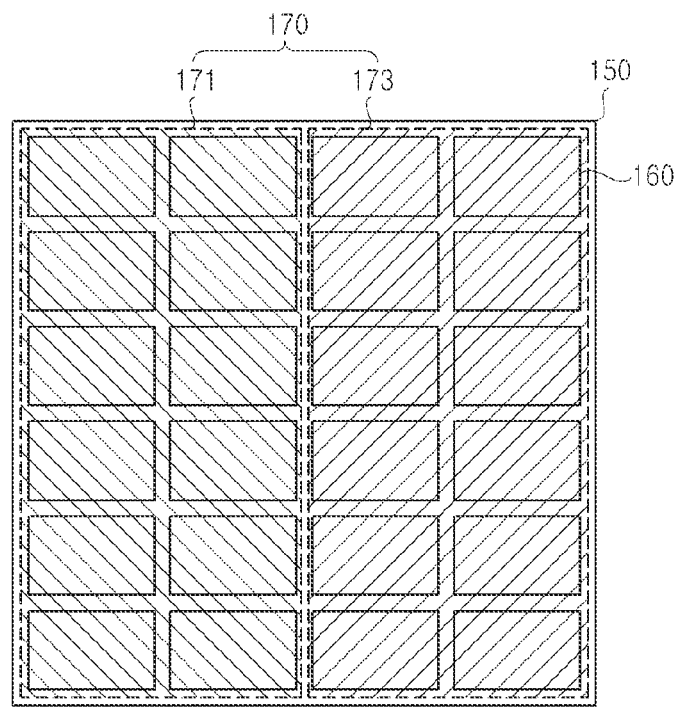
FIG. 5 illustrates a DTX compensation block according to one embodiment of the present invention.

FIG. 5 illustrates the DTX compensation block according to one embodiment of the present invention.

As shown in FIG. 5, the compensation bock determining part 141 sets the DTX compensation block 170 including at least one touch sensing block 160 corresponding to the unit for sensing a user's touch. According to one embodiment of the present invention shown in FIG. 5, for convenience of explanation, the display panel 150 may include the two DTX compensation blocks 171 and 173, wherein one DTX compensation block 170 may include the touch sensing blocks 160 arranged in 6 rows*2 columns. However, the DTX compensation blocks 170 of the present invention are not limited to the above structure.

For example, on assumption of using a multiplexer (MUX) to decrease the number of channels, when the touch sensor 140 receives the signal transmitted from the touch sensing block 160, the touch sensing blocks 160 selected by the input of the same multiplexer (MUX) in accordance with a predetermined order may be included in one DTX compensation block 170 by the compensation block determining part 141.

The Look-up Table storing part 142 may store the DTX values corresponding to the grayscale values displayed on the pixels.

According to one embodiment of the present invention, the DTX values stored in the Look-up Table storing part 142 may be shown in the following Table 1.

TABLE 1

| REG# | 1 | 2 | 3 | 4 | 5 | 6 | 7 | 8 | 9 | 10 |
|---|---|---|---|---|---|---|---|---|---|---|
| Grayscale value | 0 | 16 | 43 | 60 | 92 | 115 | 137 | 159 | 177 | 188 |
| DTX value | 0 | 60 | 89 | 118 | 147 | 176 | 207 | 236 | 265 | 295 |

TABLE 1-continued

| REG# | 11 | 12 | 13 | 14 | 15 | 16 | 17 | 18 | 19 | 20 |
|---|---|---|---|---|---|---|---|---|---|---|
| Grayscale value | 196 | 207 | 217 | 231 | 240 | 245 | 247 | 250 | 253 | 255 |
| DTX value | 326 | 355 | 383 | 414 | 440 | 478 | 498 | 529 | 564 | 590 |

Figure 9:
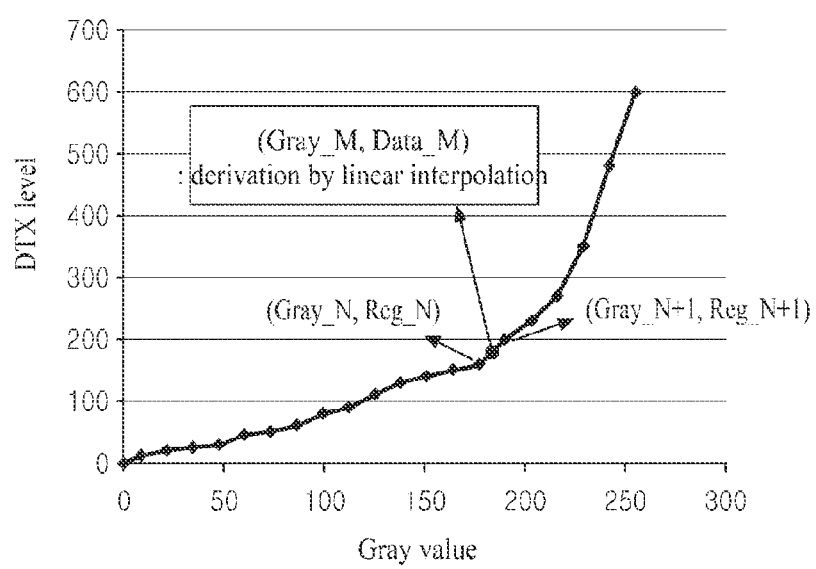
FIG. 9 illustrates an interpolation for making Look-up Table according to the present invention.

According to one embodiment of the present invention, the twenty DTX values corresponding to the grayscale values may be sampled and stored in the Look-up Table. The DTX values corresponding to the grayscale values which are not stored in the Look-up Table may be calculated by an interpolation shown in FIG. 9.

Referring once again to FIG. 4, the representative value calculating part 143 calculates the compensation representative value by the use of DTX value. The DTX value corresponds to the average of the grayscale values applied to the plurality of pixels included in the region overlapped with the DTX compensation block.

In more detail, the representative value calculating part 143 receives the DTX value corresponding to the grayscale value, that is, data value applied to the pixel from the data driver 130. The representative value calculating part 143 calculates the DTX average value corresponding to the grayscale values of the pixels included in the region overlapped with the DTX compensation block. The representative value calculating part 143 calculates the compensation representative value corresponding to the DTX average value of the DTX compensation block.

Referring to FIG. 8, the representative value calculating part 143 receives the grayscale value corresponding to the data value applied to the pixel from the data driver 130. The representative value calculating part 143 calculates the average of the grayscale values of the pixels included in the region overlapped with the DTX compensation block. The representative value calculating part 143 calculates the compensation representative value which is the DTX value corresponding to the calculated average of the grayscale values.

The DTX converting part 145 receives the DTX value corresponding to the grayscale value, that is, data value applied to the pixel from the data driver 130. The DTX converting part 145 calculates the sensing block average value corresponding to the average of the DTX values in the plurality of pixels overlapped with the touch sensing block.

The compensation value calculating part 147 calculates the DTX compensation value by the difference between the compensation representative value and the sensing block average value, and outputs the DTX compensation value to the touch sensing part 149, whereby the DTX compensation value is used to compensate for the touch data.

According to one embodiment of the present invention, the compensation value calculating part 147 may calculate the DTX compensation value by subtracting the compensation representative value from the sensing block average value.

According to another embodiment of the present invention, the display panel may include the touch sensing blocks arranged in 12 rows by 20 columns, the touch sensor may include the two multiplexers (MUX), and each multiplexer (MUX) may have the input line of 3 channels. Hereinafter, a method for calculating the DTX compensation value by the touch sensor will be described as follows.

FIG. 6 illustrates the average of the grayscale values in the touch sensing block according to the present invention. FIG. 7 illustrates the DTX compensation value of the touch sensing block according to the present invention. In FIG. 6, the number shown in the block corresponds to the average of the grayscale values displayed in the plurality of pixels overlapped with the touch sensing block. In FIG. 7, the number shown in the block corresponds to the DTX compensation value of the touch sensing block. The neighboring MUX1, MUX2 and MUX3 are the three input lines included in the multiplexer.

The grayscale value of the touch sensing block in the upper left side of FIG. 6 is '60'. As shown in the above Table 1, the DTX value corresponding to the grayscale value '60' is '118'.

Meanwhile, when the entire touch sensing block corresponding to the MUX3 is determined as one DTX compensation block, the average grayscale value of the DTX compensation block is '66', and the DTX value corresponding to the grayscale value '66' is '124' by applying interpolation on Table 1.

That is, the sensing block average value is '118' and the compensation representative value is '124'.

The compensation value calculating part 147 may calculate the DTX compensation value by subtracting the compensation representative value from the sensing block average value, wherein the DTX compensation value of the touch sensing block of the upper left side is '−6' (which is obtained by subtracting the compensation representative value '124' from the sensing block average value '118')', as shown in FIG. 7.

The touch calculating part 149 adds the DTX compensation value and user's touch raw data measured in the touch sensing block, to thereby compensate for the touch raw data. Then, the touch calculating part 149 calculates whether or not there is a user's touch by comparing the touch raw data with a touch threshold.

The touch calculating part 149 receives the touch raw data measured in the touch sensing block 160 through a touch sensing line (RX), and receives the DTX compensation value from the compensation value calculating part 147.

According to one embodiment of the present invention, the DTX compensation value is an error of the touch raw data of the corresponding touch sensing block 160, whereby the touch sensing part 149 compensates for the touch raw data by adding the DTX compensation value to the touch raw data.

According to one embodiment of the present invention, the touch calculating part 149 determines that there is a user's touch when the touch raw data compensated by the touch calculating part 149 is more than the preset touch threshold, and determines that there is no user's touch when the touch raw data compensated by the touch calculating part 149 is not more than the preset touch threshold.

Referring once again to FIG. 2, the display panel 150 may include a gate line (GL), a data line (DL), a pixel electrode, and a common electrode. During the displaying driving mode, a desired image is displayed on the display panel 150. Meanwhile, during the touch sensing mode, the display panel 150 receives a user's touch.

The gate line (GL) is formed along one direction of the substrate, for example, a longitudinal direction of the substrate. The data line (DL) is formed along another direction of the substrate, for example, a vertical direction being perpendicular to the longitudinal direction. Thus, the gate line (GL) and the data line (DL) are perpendicular to each other, to thereby define a plurality of pixel regions.

For example, the pixel may be at least any one among red (R), green (G), blue (B) and white (W) pixels. The data line (DL) may be formed at the different layer from the gate line (GL). The data line (DL) may be formed in a straight line shape, but not limited to this shape. For example, the data line (DL) may be formed in a curved line shape.

Although not shown, a thin film transistor functions as a switching device, wherein the thin film transistor is formed adjacent to a crossing portion of the gate line (GL) and the data line (DL). The thin film transistor may include a gate electrode, a semiconductor layer, a source electrode, and a drain electrode. The gate electrode is diverged from the gate line (GL), the source electrode is diverged from the data line (DL), and the drain electrode is provided at a predetermined interval from the source electrode, wherein the drain electrode and the source electrode confront each other.

The thin film transistor may vary in structure, for example, a bottom gate structure or a top gate structure. In case of the bottom gate structure, the gate electrode is positioned below the semiconductor layer. Meanwhile, in case of the top gate structure, the gate electrode is positioned above the semiconductor layer. Herein, each of the electrodes may be changed in various shapes generally known to those in the art.

The pixel electrode is formed in each pixel region, and the pixel electrode is electrically connected with the drain electrode of the thin film transistor. Especially, the pixel electrode may be directly connected with the drain electrode, but not limited to this structure.

During the displaying driving mode for displaying an image, the common electrode supplies a common voltage (Vcom) for displaying an image. Meanwhile, during the touch sensing mode for sensing a user's touch, the common electrode is driven as a touching electrode, to thereby sense a user's touch.

That is, during the displaying driving mode, the common electrode together with the pixel electrode may form an electric field, to thereby drive the liquid crystal layer. According to one embodiment of the present invention, the common electrode or pixel electrode may include at least one slit in the pixel region. Through the slit, a fringe field is formed between the common electrode and the pixel electrode, whereby the liquid crystal is driven by the fringe field.

As mentioned above, the common electrode drives the liquid crystal by forming the electric field, and forms a capacitance with a user's touch object so as to sense a user's touch during the touch sensing mode.

The touch sensing block 160 corresponds to a region for sensing a user's touch. The touch sensing block 160 may be formed on the display panel 150, and the touch sensing block 160 may be obtained by patterning the common electrode, wherein the common electrode together with the pixel electrode may form the electric field so as to display an image during the displaying driving mode.

In this case, during the displaying driving mode, the common electrode together with the pixel electrode, which is formed in the pixel region defined by the gate and data lines crossing each other on the substrate, may form the electric field so as to display an image. During the touch sensing mode, the common electrode functions as the touching electrode for sensing the change of capacitance in accordance with a user's touch.

Hereinafter, a touch sensing method of the display device according to the present invention will be described in detail with reference to the accompanying drawings.

Figure 10:
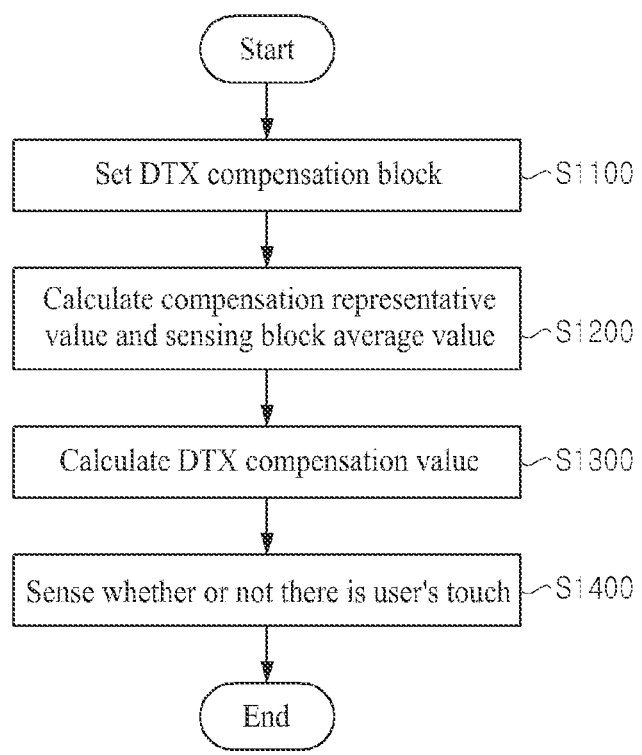
FIG. 10 is a flow chart illustrating a touch sensing method of the display device according to one embodiment of the present invention.

FIG. 10 is a flow chart illustrating a touch sensing method of the display device according to one embodiment of the present invention.

As shown in FIG. 10, the touch sensing method of the display device according to the present invention divides and drives one frame period by the time division method so that the displaying driving mode for displaying an image on the display panel and the touch sensing mode for sensing a user's touch are alternately driven for one frame period.

In more detail, during the touch sensing mode, the DTX compensation block including at least one touch sensing block corresponding to the unit for sensing a user's touch is determined (S1100).

During the touch sensing mode, the compensation representative value and the sensing block average value are calculated (S1200), wherein the compensation representative value is the DTX value corresponding to the average of the grayscale values applied to the plurality of pixels overlapped with the DTX compensation block, and the sensing block average value is the DTX value corresponding to the average of the grayscale values applied to the plurality of pixels overlapped with the touch sensing block.

During the touch sensing mode, the DTX compensation value is calculated in accordance with the difference between the compensation representative value and the sensing block average value (S1300).

Then, the DTX compensation value is added to the user's touch raw data measured in the touch sensing block, to thereby compensate for the touch raw data. After that, it is calculated whether or not there is a user's touch by comparing the touch raw data with the touch threshold (S1400).

The touch sensing method may further include calculating the Look-up Table by measuring a maximum DTX value obtained in the touch sensing block when a maximum grayscale value is applied to the plurality of pixels included in the touch sensing block.

According to the present invention, the display touch crosstalk is compensated so that it is possible to remove the noise from the touch signal.

Owing to the touch signal in which the noise is decreased, it is possible to improve a touch sensitivity.

Also, owing to the touch signal in which the noise is decreased, it is possible to improve accuracy in sensing a user's touch.

It will be apparent to those skilled in the art that various modifications and variations can be made to embodiments of the present invention without departing from the spirit or scope of the invention. Thus, it is intended that the present invention covers the modifications and variations of this invention provided they come within the scope of the appended claims and their equivalents.

What is claimed is:

1. A display device comprising:
    a timing controller for driving one frame by a time division method so as to alternately perform a displaying driving mode for displaying an image on a display panel and a touch sensing mode for sensing a user's touch; and
    a touch sensor for determining a display touch crosstalk (DTX) compensation block including at least one touch sensing block corresponding to a unit for sensing the user's touch, calculating a compensation representative value which is a DTX value corresponding to a first average of grayscale values applied to a plurality of pixels overlapped with the DTX compensation block, calculating a sensing block average value which is the DTX value corresponding to a second average of grayscale values applied to a plurality of pixels overlapped with the touch sensing block, calculating a DTX compensation value which is a difference between the compensation representative value and the sensing block average value, compensating a user's touch raw data measured in the touch sensing block by adding the DTX compensation value to the user's touch raw data, and sensing the user's touch using the compensated user's touch raw data;

wherein the touch sensor includes a compensation block determining part which determines the DTX compensation block so as to make one DTX compensation block include the touch sensing block selected by input of a same multiplexer in accordance with a predetermined order.

2. The display device of claim 1, wherein the touch sensor divides the display panel into at least one DTX compensation block, and compensates for the touch data with reference to the compensation representative value generated by each DTX compensation block.

3. The display device of claim 1, wherein the touch sensor includes a representative value calculating part which calculates the first average of the grayscale values received from a data driver and applied to the plurality of pixels included in a region overlapped with the DTX compensation block, and calculates the compensation representative value.

4. The display device of claim 1, wherein the touch sensor includes a Look-up Table storing part which calculates a Look-up Table by measuring a maximum DTX value obtained in the touch sensing block when a maximum grayscale value is applied to the plurality of pixels included in the touch sensing block.

5. The display device of claim 1, wherein the touch sensor includes a compensation value calculating part which calculates the DTX compensation value by subtracting the compensation representative value from the sensing block average value.

6. The display device of claim 1, wherein the touch sensor includes a touch sensing part which adds the DTX compensation value to the user's touch raw data measured in the touch sensing block so as to compensate for the user's touch raw data, and calculates whether or not there is the user's touch by comparing the compensated user's touch raw data with a touch threshold.

7. A touch sensing method of a display device for driving one frame by a time division method so as to alternately perform a displaying driving mode for displaying an image on a display panel and a touch sensing mode for sensing a user's touch, comprising:

determining a display touch crosstalk (DTX) compensation block including at least one touch sensing block corresponding to a unit for sensing the user's touch;

in the touch sensing mode, calculating a compensation representative value which is a DTX value corresponding to a first average of grayscale values applied to a plurality of pixels overlapped with the DTX compensation block, and calculating a sensing block average value which is a DTX value corresponding to a second average of grayscale values applied to a plurality of pixels overlapped with the touch sensing block;

in the touch sensing mode, calculating a DTX compensation value in accordance with a difference between the compensation representative value and the sensing block average value;

in the touch sensing mode, compensating a user's touch raw data measured in the touch sensing block by adding the DTX compensation value to the user's touch raw data;

calculating whether or not there is the user's touch by comparing the compensated user's touch raw data, with a touch threshold; and calculating a Look-up Table by measuring a maximum DTX value obtained in the touch sensing block when a maximum grayscale value is applied to the plurality of pixels included in the touch sensing block.

* * * * *